United States Patent [19]
Hoffman

[11] 3,906,788
[45] Sept. 23, 1975

[54] SELF-SUPPORTING STRAIN TRANSDUCER
[75] Inventor: Ira S. Hoffman, Newport News, Va.
[73] Assignee: The United States of America as represented by the National Aeronautics and Space Administration Office of General Counsel, Washington, D.C.
[22] Filed: May 23, 1974
[21] Appl. No.: 472,775

[52] U.S. Cl. ............................................. 73/141 A
[51] Int. Cl.² ........................................ G01L 1/04
[58] Field of Search ...................... 73/141 A, 141 R

[56] References Cited
UNITED STATES PATENTS
3,141,327  7/1964  Hartranft .......................... 73/141 A
3,142,981  8/1964  Gross .............................. 73/141 A
3,613,441  10/1971 Papirno ........................... 73/141 A Primary Examiner—James J. Gill
Assistant Examiner—Anthony V. Ciarlante
Attorney, Agent, or Firm—Howard J. Osborn; William H. King; John R. Manning

[57] ABSTRACT

A strain transducer for use in the measurement of static or quasi-static high strain levels at stress concentration points in holes in flat plates. Cantilever springs constructed by machining the material to appropriate flexibility, permit self-alinement, and constant contact with the test specimen. Used in conjunction with a strain gage or other transducer, it enables testing far beyond the strain gage's normal limits for high strains and number of load cycles.

11 Claims, 3 Drawing Figures

SELF-SUPPORTING STRAIN TRANSDUCER

ORIGIN OF THE INVENTION

The invention described herein was made by an employee of the United States Government and may be manufactured and used by or for the government for governmental purposes without payment of any royalties thereon or therefor.

BACKGROUND OF THE INVENTION

This invention relates generally to strain testing and more specifically to high strain level fatigue testing of stress points in holes in plate material for which the requirement of long gage life is involved.

The measurement of strain in fatigue testing of aircraft and similar structural materials requires gages that will both measure high strain levels and will do so over the long time periods and many load cycles associated with such tests. These requirements are accentuated for measurements required on the stress points in holes in plate materials because of the extremely short gage lengths required for the typical measurements of such configurations. Short gage length resistance type metal foil strain gages have been used but they are satisfactory only to establish preliminary strain levels because they are incapable of meeting the long term testing requirements. Generally available mechanical extensometers have also yielded unsatisfactory results. The disadvantages of the prior art devices are that strain gages are not capable of measuring large strains; for example, in the 3% range, for more than a few total load cycles. Total load cycles for fatigue testing are required to exceed 5,000 cycles with valid measurements over the full test span. Mechanical extensometers have been one solution to this problem on flat external surfaces, but none are available to operate within the confines of a hole bored in a flat plate.

SUMMARY OF THE INVENTION

This invention is constructed specifically for surface strain measurments at the points of high stress concentration in holes in large flat plates. The design is particularly adapted for high strain levels under conditions of an unlimited number of loads cycles. The essential concept is that of a pair of surface contact pins held in intimate contact with the point of high stress concentration by spring action acting diametrically in a hole in a flat plate. One of the surface contact pins is held rigidly while the second contact pin is held by a flat cantilever spring arm arrangement upon which is mounted a conventional strain gage or other strain reading device. As the stress concentration point of the hole elongates or shortens due to strain induced by forces applied to the flat plate, the contact pins follow the lengthening because of their pointed contact surfaces and because of the force of the spring maintaining the point contact. As the contact pin held by the flat cantilever spring arm moves relative to the other contact pin, the flat cantilver spring arm deflects and the strain gage mounted upon the flat portion senses the deflection. Since strain level in the flat cantilever spring arm is controlled by conventional mechanical design considerations, the strain induced by the deflection of the flat cantilever spring arm is orders of magnitude lower than the strain on the hole surface itself. The strain gage therefore operates well below its maximum strain levels and is capable of serving for a virtually unlimited number of cycles without failures at exceptionally high hole surface strain levels.

The preferred embodiment of the invention is constructed of one piece of metal except for the surface contact pins, and has two pairs of such pins to furnish measurements at opposite sides of a hole simultaneously. An installation spring and squeeze pins permit a finger pressure to compress the entire assembly for simple installation. When released within the hole, the assembly is self-alining. Lead wires to the strain gage are brought out of the hole at approximately right angles to the direction of spring pressure to assure no interference with the spring action.

DESCRIPTION OF THE PREFERRED EMBODIMENT

Figure 1:
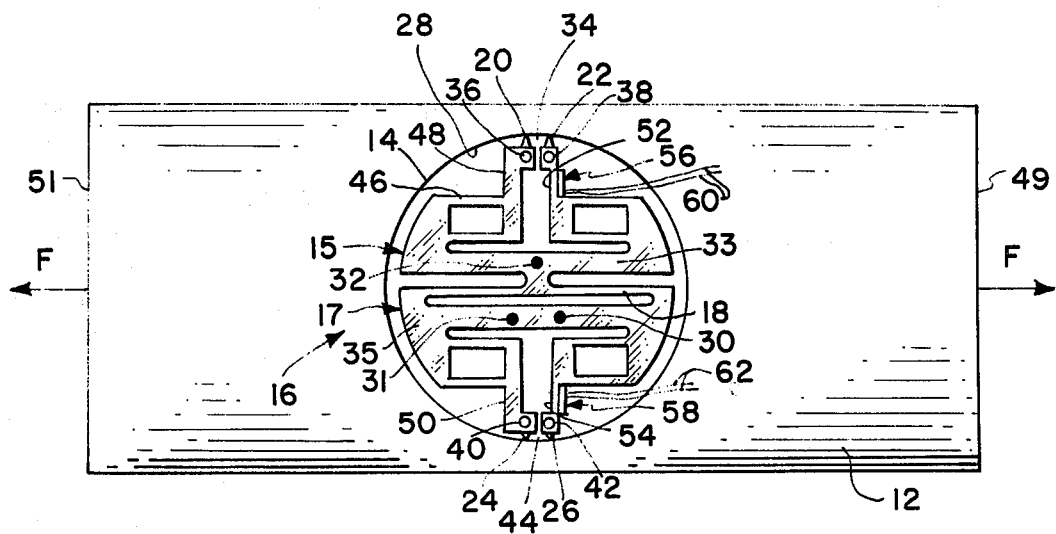
FIG. 1 is a plan view of the preferred embodiment of the invention shown mounted in a test hole.

The preferred embodiment of the invention is shown in FIG. 1 is a plan view mounted in a hole in a tensile test specimen. The hole dimension is typically a 2inch diameter. Both the test plate and the invention are ⅛ inch thick material. The configuration of the invention is machined from a single metal piece with the exception of the contact and squeeze pins.

As shown in FIG. 1 plate 12, the tensile test specimen, has within it a 2inch diameter hole 14. Strain transducer 16 consists of two separate transducer assemblies 15 and 17 and is held within hole 14 by the pressure of installation spring 18 forcing the surface contact pins 20 and 22 diametrically opposed to contact pins 24 and 26 outward against the inner surface 28 of hole 14. Strain transducer 16 is installed within hole 14 by using finger pressure to compress the installation spring. This is accomplished by applying a diametrically inward force upon squeeze pins 30 and 31 mounted on support body 35 and squeeze pin 32 on support body 33. Such force deflects installation spring 18 and reduces the overall diameter of strain transducer 16 along the line between contact pins 20 and 22 and contact pins 24 and 26 so that strain transducer 16 fits within hole 14. Upon release of the finger pressure on the squeeze pins, strain transducer 16 expands to contact inner surface 28 at contact pins 20, 22, 24, and 26. The contact pins are sufficiently pointed and the diametric spring pressure is such as to assure intimate contact between inner surface 28 and the contact pins. This intimate contact assures that the contact pins will follow any movement of the inner surface of test section 34 between adjacent pins so that the pin separation of adjacent pins will directly reflect any lengthening or shortening of inner surface 28 between such adjacent contact pins. The assembly is so constructed that contact pins 20 and 22, respectively held in by set screws 36 and 38, form one pair and define test section 34 which is 0.1 inch long; while contact pins 24 and 26 similarly retained by appropriate set screw 40 and 42 form another test section 44 diametrically opposed to test section 34.

The diametrically opposing forces are held constant by four double cantilever spring assemblies, on serving for each contact pin. For example, double cantilever spring assmebly 46 serves to furnish the force for contact pin 20. The stiffness of each double cantilever spring assembly is much less than that of installation spring 18, thus allowing the individual pin contact to be controlled almost fully by the associated double cantilever spring assembly. This independent action also allows each pin to maintain positive contact over a relatively broad range of opposing contact pin spacing variations, such as those caused by poor specimen contact surfaces, different length pins and hole shape changes during specimen loading.

The two meausring systems formed at test section 34 and 44 yield independent measurements when force F is applied between surfaces 49 and 51. Outward force causes the test sections to elongate and the elongation is followed by the appropriate pair of contact pins. Inward force acts similarly to cause shortening of the test sections. Contact pins 24 and 20, one pin of each pair, are held rigid, in relation to motion caused by the elongation or shortening of their associated specimens by arms 48 and 50. However, contact pins 22 and 26 are held by flat cantilver spring arms 52 and 54. As test section 34 elongates or shortens, contact pin 20 remains in place but contact pin 22 moves relative to contact pin 20 and causes flat cantilever spring arm 52 to deflect. This deflection is sensed by strain gage 56 connected to an electrical sensing circuit, not shown, by electrical leads 60. Strain gage 58 and electrical leads 62 serve similarily for pin 26.

The level of strain measured upon flat cantilever springs 52 and 54 is directly proportional to the actual strain on test specimens 34 and 44 but is so much less that strain gages 56 and 58 serve for an unlimited number of load cycles. Direct use of strain gages upon the test specimens would cause rapid deterioration of the strain gage and no strain gage could be used throughout an entire fatigue test.

Figure 2:
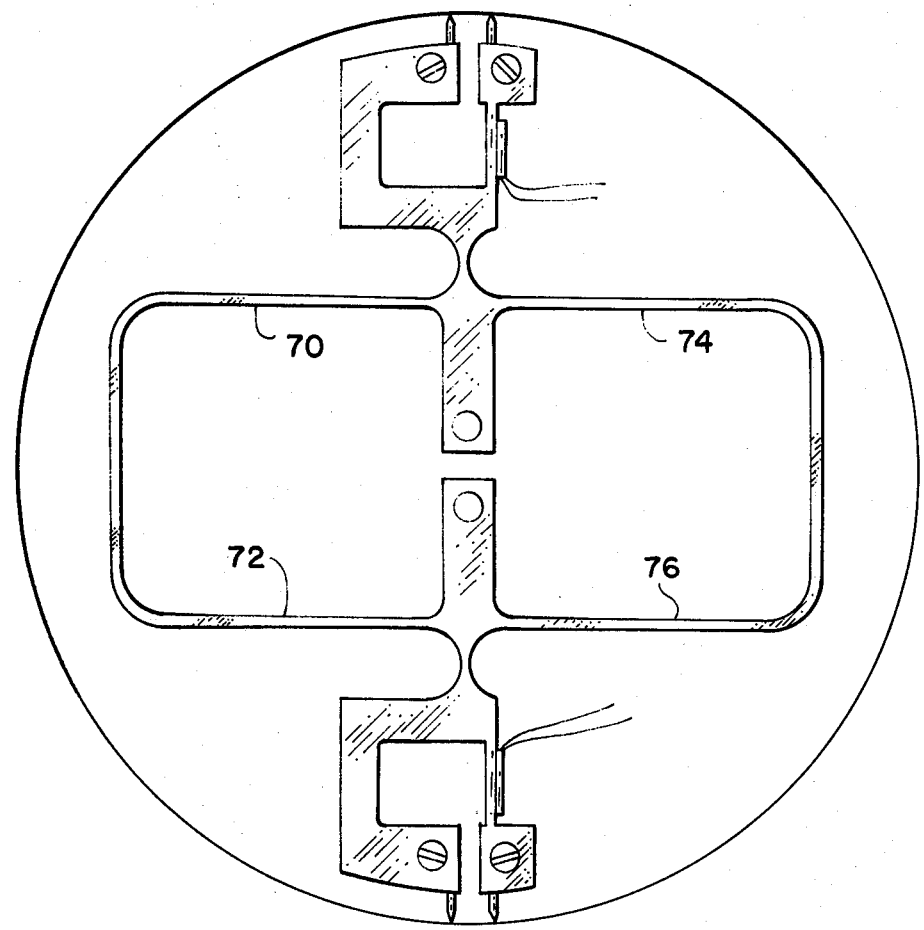
FIG. 2 is a plan view of an alternate embodiment.

The alternate embodiment shown in FIG. 2 operates in a similar fashion to the preferred embodiment. It differs only in that the functions of both the installation spring and the double cantilever spring assemblies are performed by springs 70, 72, 74 and 76. Such a construction simplifies the structure but sacrifices the independent suspension of each pin. The embodiment is therefore somewhat more sensitive to surface irregularities and similar variations.

Figure 3:
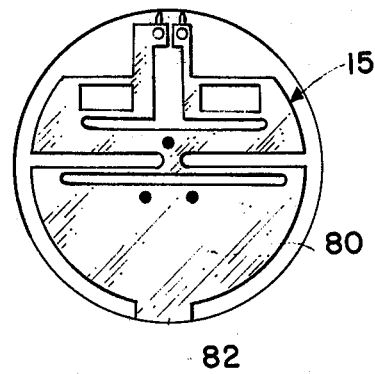
FIG. 3 is a plan view of an alternate embodiment showing only a single test section.

It is to be understood that the forms of the invention herein shown are merely preferred embodiments. Various changes can be made in the shape, size, and arrangements of parts: equivalent means may be substituted for those described and certain features may be used independently from other features without departing from the spirit and scope of the invention. For instance, the invention could be constructed with only one transducer assembly as shown in FIG. 3. In such a configuration installation spring base 80 and bearing 82 serve to replace the second transducer assembly. The various pins could also be of different shape or retained in a different manner. Moreover, while single-piece construction is highly desirable, the invention could be constructed of several parts assembled to function in a similar manner.

What is claimed as new and desired to be secured by Letters Patent of the United States is:

1. An apparatus for measurement of surface strain within holes comprising at least one transducer assembly comprising:

two surfaces contact pins intimately contacting the inner surface of a hole, said surface contact pins defining a test section on said inner surface by their separation;

rigid support means for the first of said surface contact pins; including a retaining means for attaching said first surface contact pin to said rigid support means but permitting said first surface contact pin to protrude therefrom;

flat cantilever support means for the second of said surface contact pins, including a retaining means for attaching said second surface contact pin to said flat cantilever support but permitting said second surface contact pin to protrude therefrom;

strain sensing means attached to said flat cantilever support means by conventional means;

first spring suspension means attached to said rigid support means providing force to constantly maintain said first surface contact with said inner surface;

second spring suspension means attached to said flat cantilever support means providing force to constantly maintain said second surface contact pin in intimate contact with said inner surface; support body to which both first and second spring suspension means are attached;

installation spring means attached to said support body which when compressed decreases the diametric dimension of said transducer assembly to facilitate placement of said assembly in the hole, said installation spring means including means for bearing against the inner surface of said hole diametrically opposite from said test section defined by said surface contact pins; and compression means for compressing said installation spring means.

2. An apparatus for measurement of surface strain within holes as in claim 1 wherein said first and second spring suspension means are each double cantilever spring assemblies.

3. An apparatus for measurement of surface strain within holes in flat plates as in claim 1 wherein said compression means is at least two squeeze pins.

4. An apparatus for measurement of surface strain within holes as in claim 1 wherein said strain sensing means is a strain gage.

5. An apparatus for measurement of surface strain within holes as in claim 1 comprising first and second transducer assemblies attached at said installation springs wherein said transducer assemblies each occupy essentially one half of the cross section of said hole and are mounted diametrically opposed to cause the spring forces of said first transducer assembly to oppose the spring forces of said second transducer assembly.

6. An apparatus for measurement of surface strain within holes as in claim 5 wherein the installation spring and compression means of each of two transducer assmeblies are combined into one installation spring and compression means serving both transducer assemblies at their common point.

7. An apparatus for measurement of surface strain within holes as in claim 6 wherein said first and second spring suspension means of each of two transducer assemblies are each double cantilever spring assemblies.

8. An apparatus for measurement of surface strain within holes as in claim 6 wherein said compression means is at least two squeeze pins.

9. An apparatus for measurement of surface strain within holes as in claim 6 wherein the strain reading means are strain gages.

10. An apparatus for measurement of surface strain within a hole comprising at least one transducer assembly comprising:
    first and second surface contact pins;
    rigid means for supporting at one of its ends said first contact pin;
    flexible means for supporting at one of its ends said second contact pin;
    the other ends of said rigid means and said flexible means being integral with each other such that when said apparatus is placed in said hole said first and second contact pins are less than 90° apart around said hole;
    strain sensing means attached to said flexible support means for producing an indication of strain upon said flexible support means; and
    means for placing and keeping said first and second surface contact pins in intimate contact with the surface of said hole whereby a strain produced on the surface of said hole between said contact pins causes the distance between said contacts pins to vary and produces a proportional strain indication from said strain sensing means.

11. An apparatus for measurement of surface strain within a hole as in claim 10 wherein said means for placing and keeping said first and second contact pins in intimate contact with the surface is a second transducer assembly with the midpoint between its first and second contact pins being 180° around said hole from the midpoint between the first and second contact pins of said one transducer assembly and a spring means between said one and second transducer assemblies.

* * * * *